United States Patent
Shang et al.

(10) Patent No.: US 11,306,768 B2
(45) Date of Patent: Apr. 19, 2022

(54) FOLDABLE WALKING BEAM FOR SUCKER ROD PUMPING SYSTEMS

(71) Applicants: Wei Shang, Sydney (CA); Craig Daye, Musquodoboit Harbour (CA); Jiacheng Shang, Halifax (CA)

(72) Inventors: Wei Shang, Sydney (CA); Craig Daye, Musquodoboit Harbour (CA); Jiacheng Shang, Halifax (CA)

(*) Notice: Subject to any disclaimer, the term of this patent is extended or adjusted under 35 U.S.C. 154(b) by 0 days.

(21) Appl. No.: 16/731,694

(22) Filed: Dec. 31, 2019

(65) Prior Publication Data
US 2020/0347876 A1 Nov. 5, 2020

Related U.S. Application Data

(60) Provisional application No. 62/843,476, filed on May 5, 2019.

(51) Int. Cl.
*F16C 11/04* (2006.01)
*E21B 43/12* (2006.01)

(52) U.S. Cl.
CPC ............ *F16C 11/04* (2013.01); *E21B 43/127* (2013.01)

(58) Field of Classification Search
CPC ............................. E21B 43/127; F16C 11/04
See application file for complete search history.

(56) References Cited

U.S. PATENT DOCUMENTS 2,098,290 A * 11/1937 Hinkle ................ E21B 43/127
74/519

* cited by examiner

*Primary Examiner* — James G Sayre

(57) ABSTRACT

A two-piece coupling walking beam is foldable and separable for sucker rod pumping system shipment, storage, installation, or servicing. It provides a two-piece coupling walking beam using connection plates—a pin plate, a fastening plate, and/or strengthening plate(s) for sucker rod pumping systems. A foldable walking beam with a two-piece coupling beam has a connection joint by which the portion with a horsehead located in the front end of the beam for sucker rod pumping systems wherein the walking beam can be folded either transversely (horizontally or sideways) or longitudinally (vertically) to the other portion of the beam without a horsehead to provide working space for system maintenance, installation/reinstallation, or servicing.

3 Claims, 11 Drawing Sheets

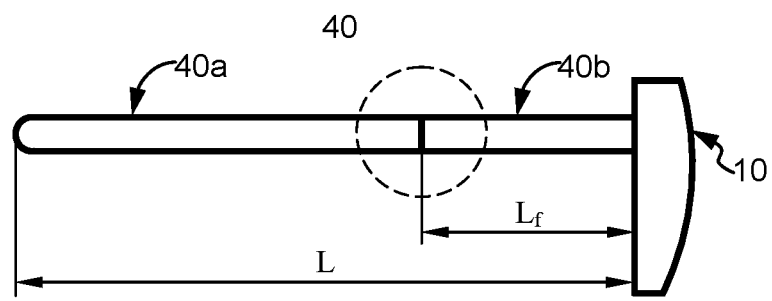
FIG. 2
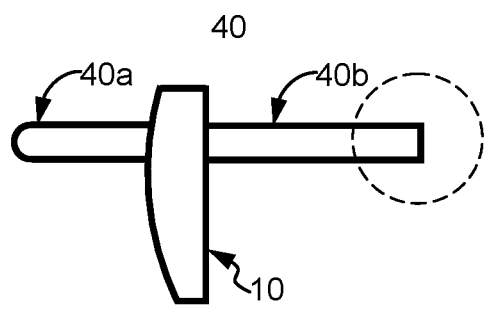 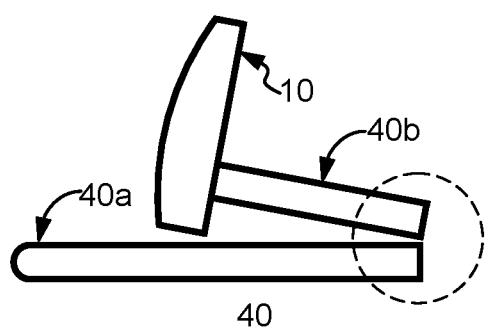
FIG. 3A          FIG. 3B

FOLDABLE WALKING BEAM FOR SUCKER ROD PUMPING SYSTEMS

BACKGROUND OF THE INVENTION

In artificial lifting, pumping is one of the major techniques used to produce crude in the oil field. It has been used to increase the oil flowing rate during oil production. The well can be lifted using a sucker rod beam pump, a progressive cavity pump (PCP), or an electrical submersible pump (ESP) etc. The sucker rod beam pump is a simple type of pump for oil well artificial lift, which has been used for years within tubing and casing to lift a column of fluid, such as crude oil, up the well bore to the surface.

A sucker rod pumping system includes a walking beam pumping unit at the surface and a plunger pump submerged in the production liquid of the well. The pumping systems have proved to be cost effective because of the simple design, operation, and maintenance. Sucker-rod beam pumps can be operated efficiently over a wide range of production rates and well depths by operators of varying experience. They also have a high salvage value which makes them more popular than other types of artificial lifting methods.

The plunger pump is connected to a string of sucker rods that extends through the production tubing from the pump to the surface. The subsurface pumping unit is typically located over one mile below the ground surface. The plunger or working barrel can be over 20 feet in length. In operation, the string of rods is oscillated by a pump jack through a stuffing box combined with a polished rod to maintain a good liquid seal which is located at the surface. The plunger reciprocates within a working barrel while the string of rods is oscillating. Next, the fluid is pumped to the surface so that it is directed into a lateral flow line by the stuffing box mounted on the wellhead.

The sucker-rod beam pumping unit has several major components which includes a crank, a linkage bar (pitman), a walking beam, supporting posts (Sampson posts), and a horsehead. The upper end of the polished rod connects to the horsehead using wirelines through a bridle block. On the lower end it connects to the sucker rod string which drives the subsurface pump components. When the crank rotates, the horsehead moves vertically up and down so that the sucker-rod string with the polished rod reciprocates in a vertical direction.

Over a period of operation, the fluid in the well bore corrodes and erodes the surfaces of the tubing, casing, and components of a plunger pump. Heavier hydrocarbons such as paraffin, asphaltene, and scale deposit on the surfaces after they precipitate out from liquid phase due to temperature variations. Contamination occurs with paraffin, silt, sulfide deposits, and various other compounds. The corrosion rate relies on the fluid temperature. The fluid composition and temperature gradient affect both the corrosion rate and deposition rate on surfaces. The effects of the corrosion and particle deposition on surfaces not only decrease the pumping efficiency but also accelerate the pump deterioration rate. The plunger will engage the surface corrosion or particle deposition (or the combination of both) on the tubing surface. It could also engage sand particles because the plunger outer diameter is designed the same as the tubing inner diameter with a design clearance to lift fluid up to the surface. Before the plunger body becomes stuck inside the tubing or damages the pump, the plunger pump needs to be lifted from the wellbore down hole up to the surface for cleaning and repairs.

Although sucker rod pumping systems are relatively simple units, maintenance and installation of the units are time consuming and expensive. Pulling the subsurface unit up to the surface is required to repair and clean the subsurface pump components. For example, the standing valve, traveling valve, plunger, working barrel, as well as the seals between the plunger and working barrel all need to be pulled out and serviced. Sucker-rod pumping systems are large and heavy. A significant amount of space is required for the pumping components of the subsurface pumping unit when they are pulled up to the surface for servicing. The horsehead is a heavy component and needs to be disconnected from the walking beam to pull up the pumping unit. Removing the horsehead is time consuming, dangerous and technically difficult. Improper removal often leads to damaged components and is a potential source for accidents in the oil field.

This invention requires no disconnection between the horsehead and the walking beam for system servicing, which is realized when using a two-piece foldable walking beam. Accordingly, the application of the two-piece foldable walking beam can result in significant savings in both equipment replacement and service costs in a pumping oil well.

SUMMARY OF THE INVENTION

It is an object and feature of the present invention to provide a two-piece coupling walking beam using connection plates—a pin plate, a fastening plate, and/or strengthening plate(s) for sucker rod pumping systems. The two-piece coupling walking beam is separable and foldable for sucker rod pumping system shipment, storage, installation, or servicing.

It is another object of this invention to provide a foldable walking beam with a two-piece coupling beam having a connection joint by which the portion with a horsehead located in the front end of the beam for sucker rod pumping systems wherein the walking beam can be folded axially either latitudinally (horizontally or sideways) or longitudinally (vertically) to the other portion of the beam without a horsehead to provide working space for system maintenance, installation/reinstallation, or servicing.

BRIEF DESCRIPTION OF THE DRAWING

The invention will be better understood by reference to the accompanying drawings, wherein:

FIG. 2 of the drawings illustrates a two-piece separable and foldable walking beam for sucker rod pumping systems, the position of the joint for connection satisfies $0 \leq L_f < L$;

FIG. 3A of the drawings illustrates a two-piece separable and foldable walking beam in an axially (latitudinally or horizontally) folded position;

FIG. 3B of the drawings illustrates a two-piece separable and foldable walking beam in an axially (longitudinally or vertically) folded position;

DESCRIPTION OF THE PREFERRED EMBODIMENTS

Figure 1A:
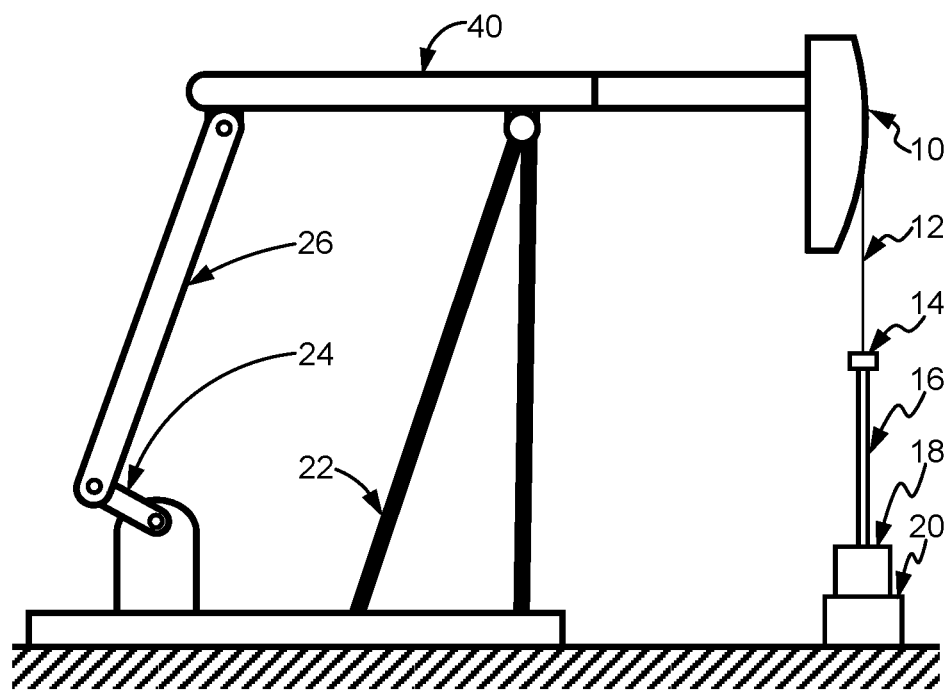
FIG. 1A of the drawings is a diagrammatic drawing of a sucker rod pumping system for a conventional unit with a two-piece separable and foldable walking beam.
Figure 1B:
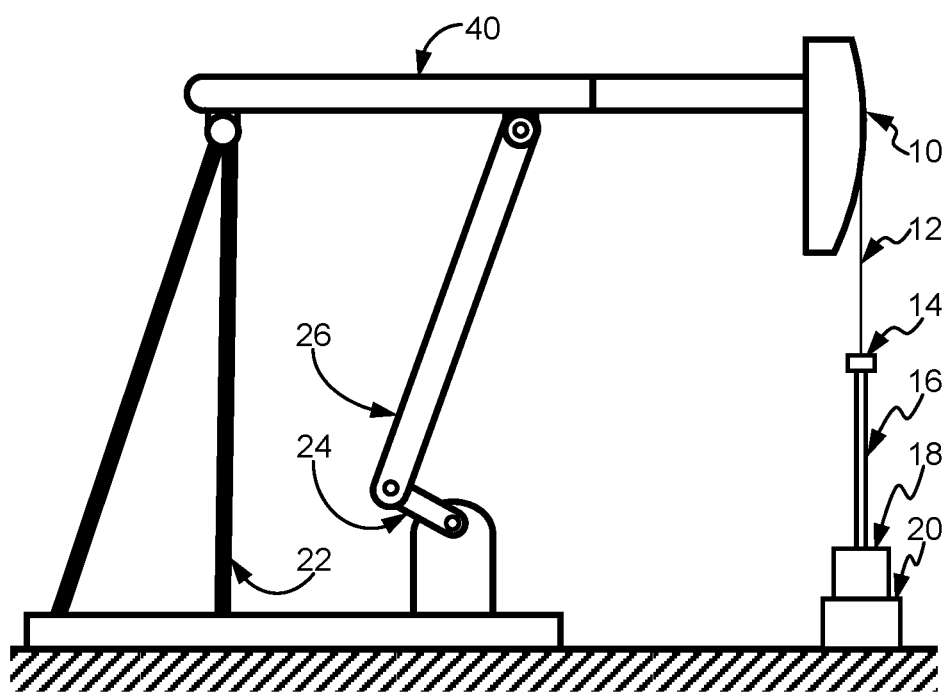
FIG. 1B of the drawings is a diagrammatic drawing of a sucker rod pumping system for a Lufkin Mark II unit with a two-piece separable and foldable walking beam.
Figure 1C:
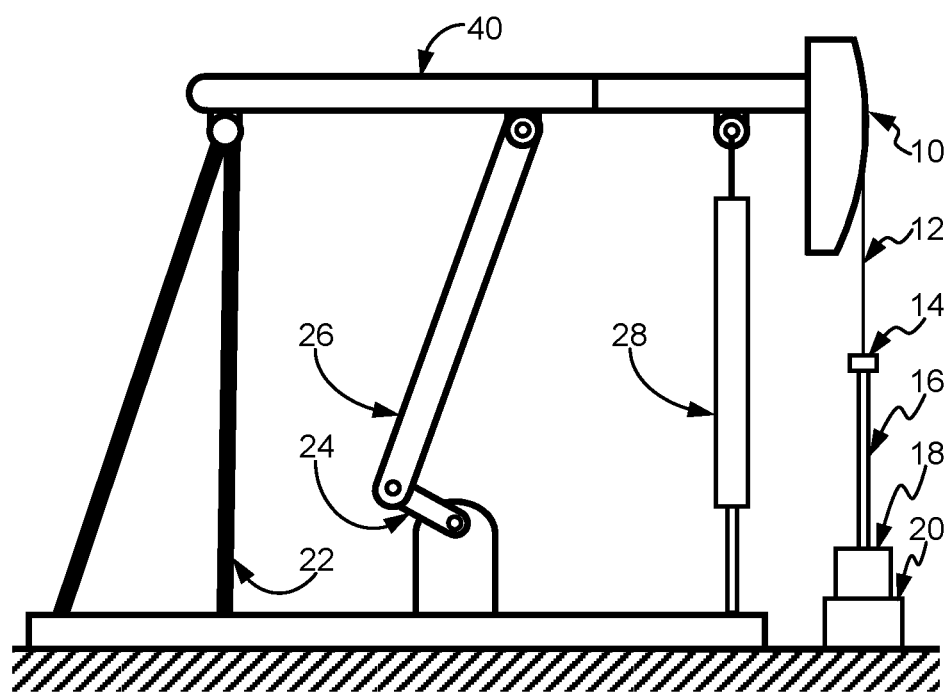
FIG. 1C of the drawings is a diagrammatic drawing of a sucker rod pumping system for an air-balanced unit with a two-piece separable and foldable walking beam.

Referring initially to FIG. 1 of the drawings, a sucker rod pumping unit is illustrated for a conventional unit, a Lufkin Mark II unit, and an air-balanced unit with a two-piece separable and foldable walking beam, which is different from the existing sucker rod pumping units. The sucker rod pumping units, as illustrated in FIGS. 1A-1C, have several major components which are a crank 24, a linkage bar (pitman) 26, a foldable walking beam 40, supporting posts (Sampson posts) 22, and horsehead 10. The air-balanced unit, as illustrated in FIG. 1C, has an additional component—compressed air component 28. The horsehead 10 is located vertically above the well head 20 and the sucker rod string (not illustrated) extends vertically downward from a polished rod 16 to a down-hole pump (not illustrated) which is designed to pump production fluid vertically upward. The outer surface of the polished rod 16 has a very smooth finish to reduce the friction between rod 16 and the seals in a stuffing box 18. The upper end of the polished rod 16 connects to the horsehead 10 using wirelines 12 through a bridle block 14. On the lower end of the polished rod 16, it connects to the sucker rod string which drives the subsurface pump components (not illustrated). When the crank 24 rotates, the horsehead 10 moves vertically up and down so that the sucker-rod string with the polished rod 16 reciprocates in a vertical direction.

Referring to FIG. 2 of the drawings, a two-piece separable and foldable walking beam fitted with a horsehead 10 for a sucker rod pumping unit is illustrated by reference numeral 40 which is in the operating position for pumping. The foldable walking beam 40 is composed of two pieces—left beam piece 40a and right beam piece 40b—which are connected and fastened using connection plates—a pin plate, a fasten plate, and/or strengthening plates. The joint position for the foldable walking beam 40 satisfies a relationship of $0 \leq L_f < L$. The walking beam 40 can be folded in an axially (latitudinally or horizontally) folded position as illustrated in FIG. 3A or an axially (longitudinally or vertically) folded position as illustrated in FIG. 3B.

Figure 4A:
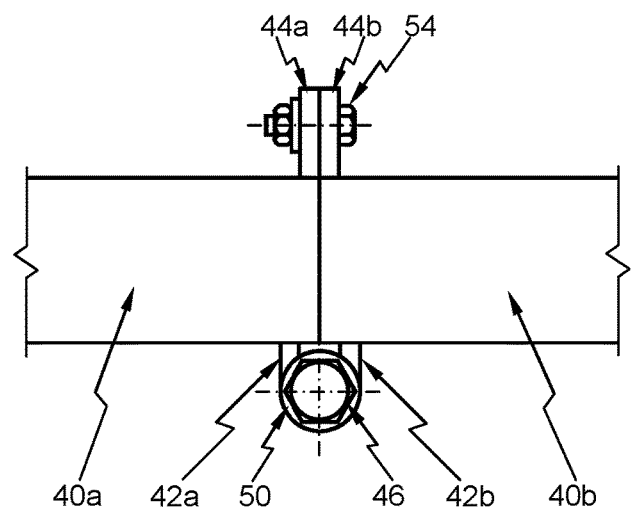
FIG. 4A of the drawings is an enlarged top view illustrated in FIGS. 2 and 3A for the connection of a two-piece separable and foldable walking beam, which is axially (latitudinally, or horizontally, or sideways) foldable when the system requires servicing.
Figure 4B:
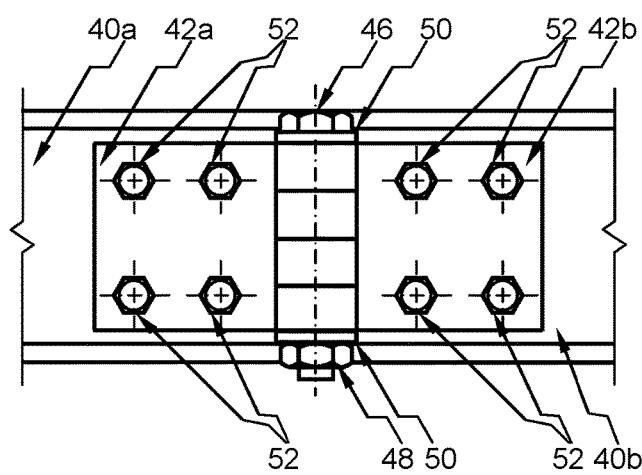
FIG. 4B of the drawings is an enlarged front view illustrated in FIGS. 2 and 3A for the connection of a two-piece separable and foldable walking beam, which is axially (latitudinally, or horizontally, or sideways) foldable when the system requires servicing.
Figure 4C:
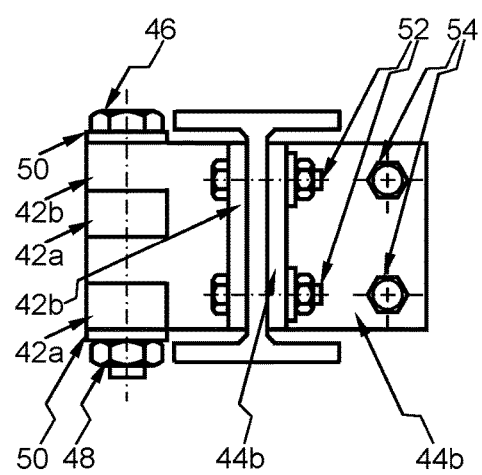
FIG. 4C of the drawings is an enlarged side view illustrated in FIGS. 2 and 3A for the connection of a two-piece separable and foldable walking beam, which is axially (latitudinally, or horizontally, or sideways) foldable when the system requires servicing.
Figure 5A:
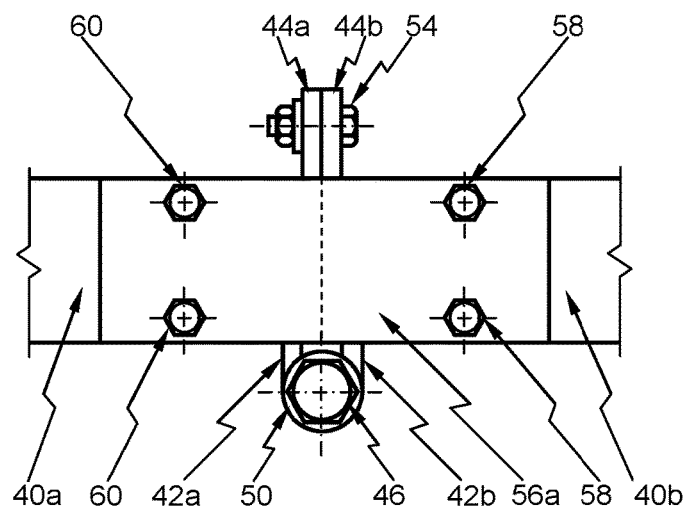
FIG. 5A of the drawings is an enlarged top view illustrated in FIGS. 2 and 3A for the connection of a two-piece separable and foldable walking beam, which is axially (latitudinally, or horizontally, or sideways) foldable when the system requires servicing.
Figure 5B:
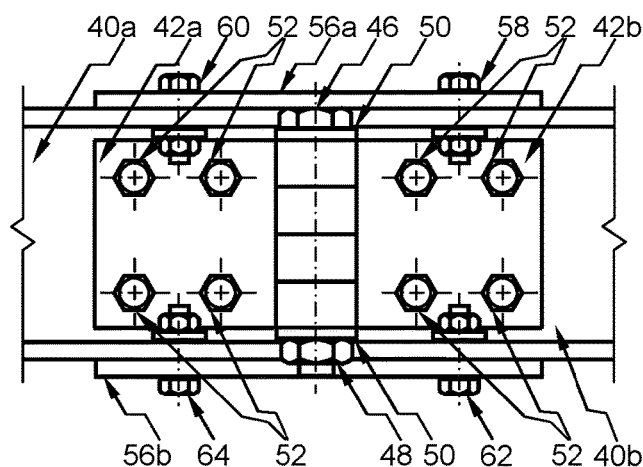
FIG. 5B of the drawings is an enlarged front view illustrated in FIGS. 2 and 3A for the connection of a two-piece separable and foldable walking beam, which is axially (latitudinally, or horizontally, or sideways) foldable when the system requires servicing.
Figure 5C:
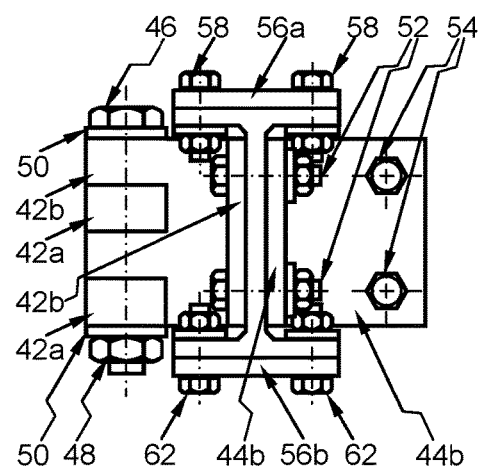
FIG. 5C of the drawings is an enlarged side view illustrated in FIGS. 2 and 3A for the connection of a two-piece separable and foldable walking beam, which is axially (latitudinally, or horizontally, or sideways) foldable when the system requires servicing.
Figure 6A:
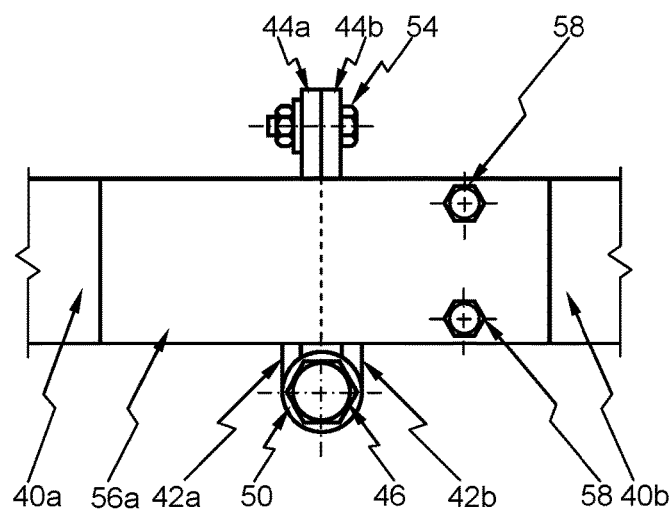
FIG. 6A of the drawings is an enlarged top view illustrated in FIGS. 2 and 3A for the connection of a two-piece separable and foldable walking beam, which is axially (latitudinally, or horizontally, or sideways) foldable when the system requires servicing.
Figure 6B:
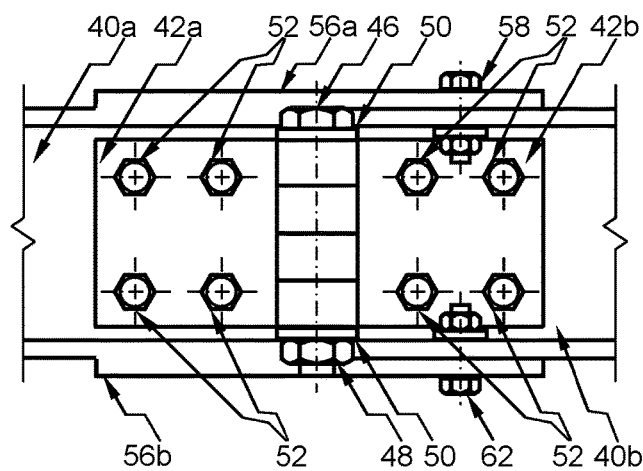
FIG. 6B of the drawings is an enlarged front view illustrated in FIGS. 2 and 3A for the connection of a two-piece separable and foldable walking beam, which is axially (latitudinally, or horizontally, or sideways) foldable when the system requires servicing.
Figure 6C:
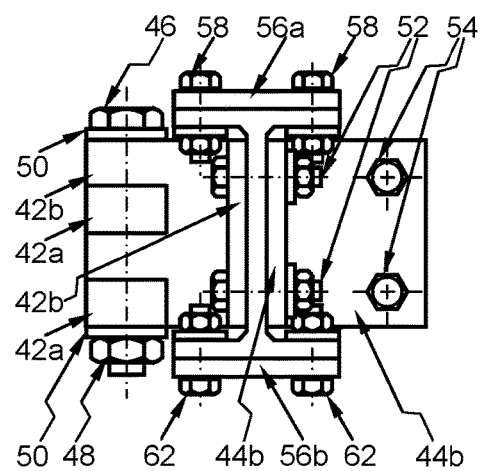
FIG. 6C of the drawings is an enlarged side view illustrated in FIGS. 2 and 3A for the connection of a two-piece separable and foldable walking beam, which is axially (latitudinally, or horizontally, or sideways) foldable when the system requires servicing.

As illustrated in FIGS. 4-6, in a most preferred embodiment of the invention, when a sucker rod pumping system requires servicing (for example plunger body cleaning, plunger pump repair, or component replacement), the horsehead 10 which is vertically above the well head 20 as illustrated in FIG. 1 has to be moved away from its operating position. This is accomplished by rotating the right piece 40b of the walking beam 40 fitted with the horsehead 10 and locking it to the left piece 40a of the beam 40 around a pin bolt 46 axially (latitudinally or horizontally) as illustrated in FIG. 3A by unfastening the bolts 54, as illustrated in FIG. 4, or by unfastening the bolts 54, 58 and 62, or bolts 54, 60 and 64 as illustrated in FIG. 5, or by unfastening the bolts 54, 58 and 62 as illustrated in FIG. 6, instead of dismantling the horsehead 10 from the walking beam 40. On one side of the beam 40, the two pieces—left piece 40a and right piece 40b—of the beam 40 are connected by a pin plate 42—left pin plate 42a and right pin plate 42b—using the bolt pin 46 with pin bolt screw 48 and washers 50. On the other side of the beam 40, the two pieces (40a and 40b) of the beam 40 are fastened by a fastening plate 44—left fastening plate 44a and right fastening plate 44b—using bolts 54. The pin plate 42 (42a and 42b) and the fastening plate 44 (44a and 44b) are attached using bolts 52 to each side of the walking beam 40 (40a and 40b) respectively, as illustrated in FIGS. 4-6.

To enhance the strength of the connection between the two pieces 40a and 40b of a foldable walking beam 40 for the pumping unit, additional strengthening plates 56a and 56b can be added to the top and bottom of foldable walking beam 40 as illustrated in FIG. 4. Further illustrated details are found in FIGS. 5 and 6. As illustrated in FIG. 5 of the drawings, the left parts of the top strengthening plate 56a and the bottom strengthening plate 56b are both fastened to the top and bottom of the left piece 40a of the foldable walking beam 40 using bolts 60 and 64, respectively. The right parts of the strengthening plates 56a and 56b are fastened to the top and bottom of the right piece 40b of the foldable walking beam 40 using bolts 58 and 62, respectively. As illustrated in FIG. 6 of the drawings, the left parts of the top strengthening plate 56a and the bottom strengthening plate 56b are permanently welded or joined using adhesive to the top and bottom of the left piece 40a of the foldable walking beam 40 while the right parts of the top strengthening plate 56a and the bottom strengthening plate 56b are fastened to the top and bottom of the right piece 40b of the foldable walking beam 40 using bolts 58 and 62, respectively.

Figure 7A:
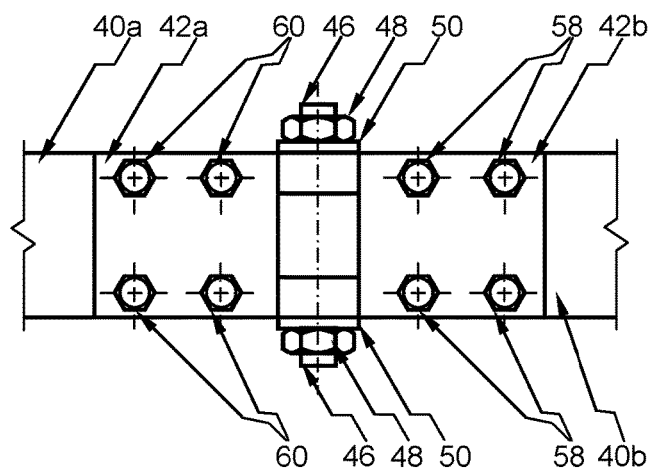
FIG. 7A of the drawings is an enlarged top view illustrated in FIGS. 2 and 3B for the connection of a two-piece separable and foldable walking beam, which is axially (longitudinally or vertically) foldable when the system requires servicing.
Figure 7B:
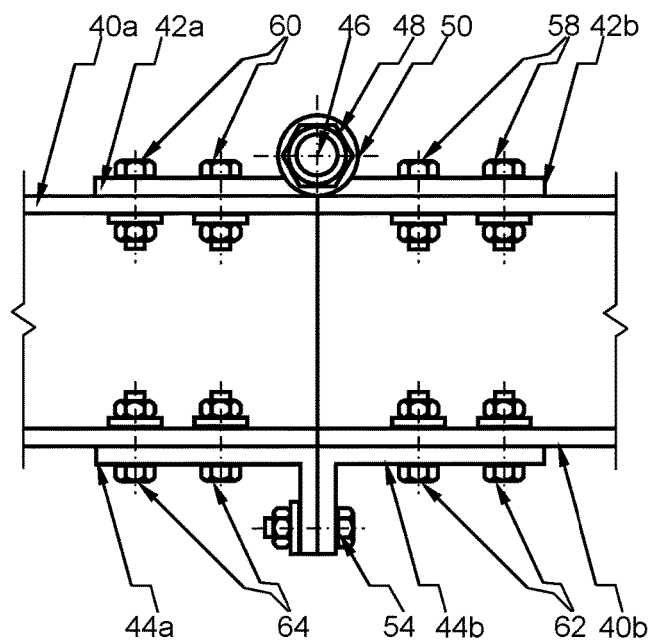
FIG. 7B of the drawings is an enlarged front view illustrated in FIGS. 2 and 3B for the connection of a two-piece separable and foldable walking beam, which is axially (longitudinally or vertically) foldable when the system requires servicing.
Figure 7C:
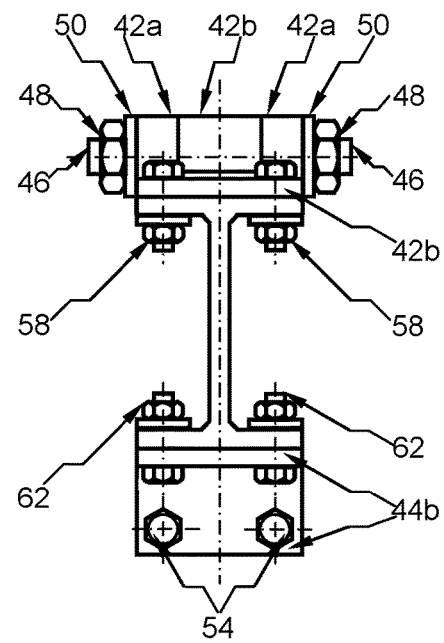
FIG. 7C of the drawings is an enlarged side view illustrated in FIGS. 2 and 3B for the connection of a two-piece separable and foldable walking beam, which is axially (longitudinally or vertically) foldable when the system requires servicing.

As illustrated in FIG. 7, in another most preferred embodiment of the invention, when the sucker rod pumping system requires servicing (such as plunger pump repairs, or plunger body cleaning, or component replacement), the horsehead 10 which is vertically above the well head 20 as illustrated in FIG. 1 needs to be moved away from its operating position. This occurs by rotating the right piece 40b of the walking beam 40 fitted with a horsehead 10 and locking it to the left piece 40a of the walking beam 40 around pin bolt 46 axially (longitudinally or vertically) as illustrated in FIG. 3B by unfastening the bolts 54 instead of dismantling the horsehead 10 from the walking beam 40. The two pieces—left piece 40a and right piece 40b—of the foldable walking beam 40 are connected by pin plate 42 and fastening plate 44 using bolts 58, 60, 62, and 64. The two parts—left pin plate 42a and right pin plate 42b—of pin plate 42 are joined through a pin bolt 46 with pin bolt screws 48 and washers 50. The two parts—left fastening plate 44a and right fastening plate 44b—of fastening plate 44 are connected using bolts 54. On the top of beam 40 the left pin plate 42a and right pin plate 42b of pin plate 42 are fastened to the left piece 40a and right piece 40b of beam 40 using bolts 60 and 58 respectively. Under the bottom of beam 40 the left fastening plate 44a and right fastening plate 44b of fastening plate 44 are connected to the left piece 40a and right piece 40b of beam 40 using bolts 64 and 62 respectively.

Figure 8A:
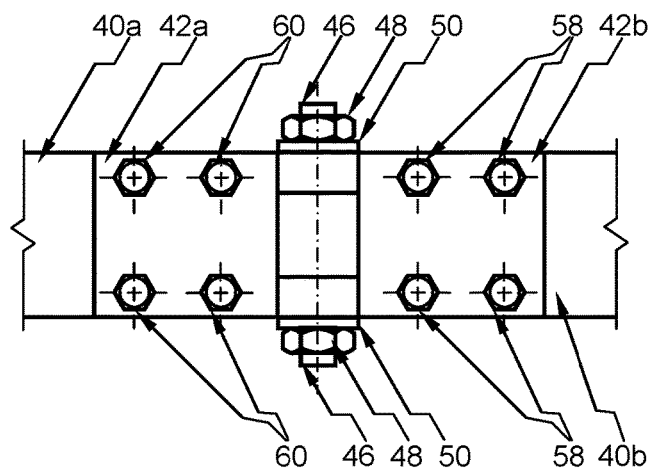
FIG. 8A of the drawings is an enlarged top view illustrated in FIGS. 2 and 3B for the connection of a two-piece separable and foldable walking beam, which is axially (longitudinally or vertically) foldable when the system requires servicing.
Figure 8B:
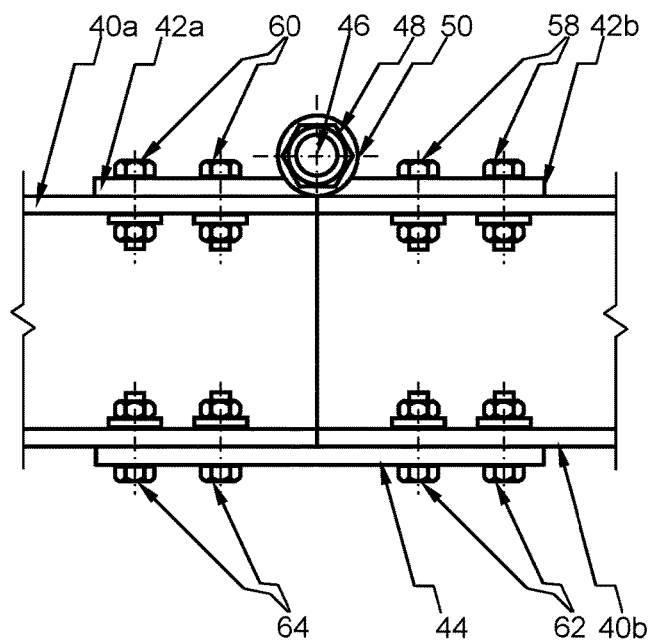
FIG. 8B of the drawings is an enlarged front view illustrated in FIGS. 2 and 3B for the connection of a two-piece separable and foldable walking beam, which is axially (longitudinally or vertically) foldable when the system requires servicing.
Figure 8C:
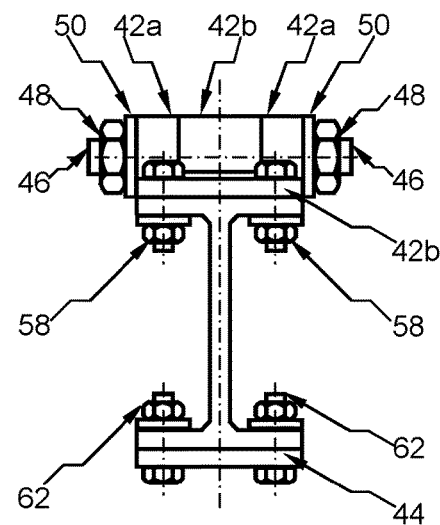
FIG. 8C of the drawings is an enlarged side view illustrated in FIGS. 2 and 3B for the connection of a two-piece separable and foldable walking beam, which is axially (longitudinally or vertically) foldable when the system requires servicing.
Figure 9A:
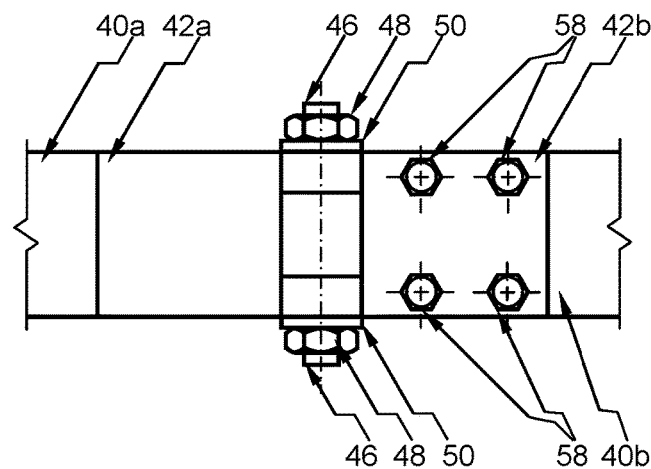
FIG. 9A of the drawings is an enlarged top view illustrated in FIGS. 2 and 3B for the connection of a two-piece separable and foldable walking beam, which is axially (longitudinally or vertically) foldable when the system requires servicing.
Figure 9B:
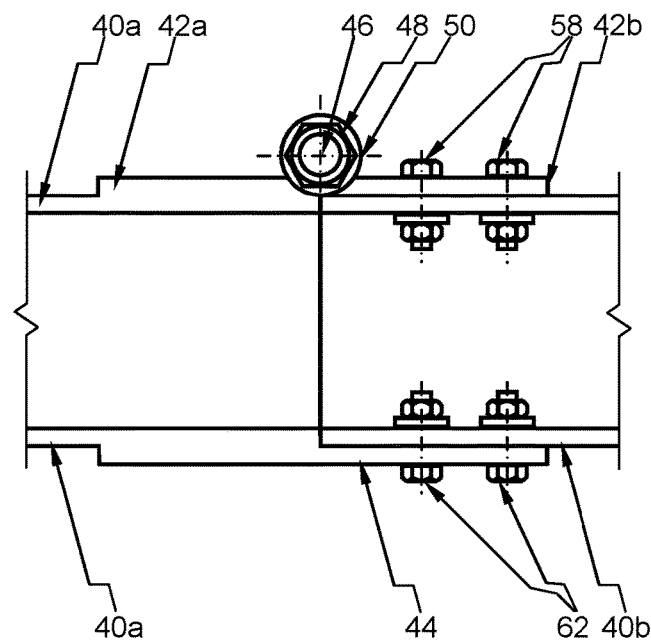
FIG. 9B of the drawings is an enlarged front view illustrated in FIGS. 2 and 3B for the connection of a two-piece separable and foldable walking beam, which is axially (longitudinally or vertically) foldable when the system requires servicing.
Figure 9C:
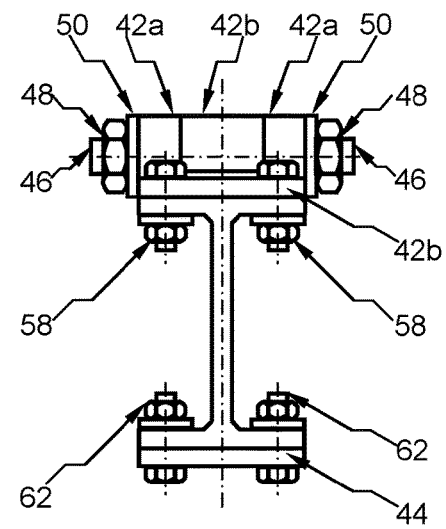
FIG. 9C of the drawings is an enlarged side view illustrated in FIGS. 2 and 3B for the connection of a two-piece separable and foldable walking beam, which is axially (longitudinally or vertically) foldable when the system requires servicing.
Figure 10A:
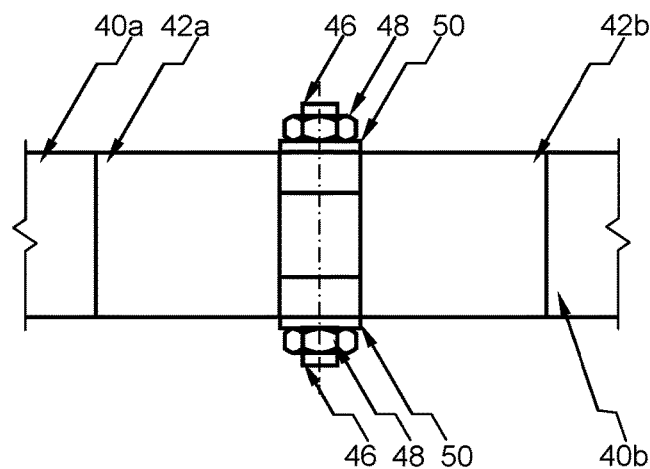
FIG. 10A of the drawings is an enlarged top view illustrated in FIGS. 2 and 3B for the connection of a two-piece separable and foldable walking beam, which is axially (longitudinally or vertically) foldable when the system requires servicing.
Figure 10B:
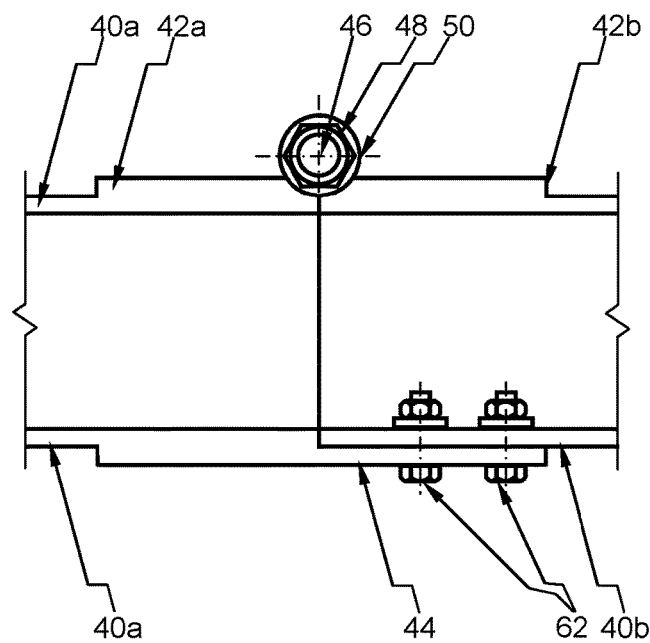
FIG. 10B of the drawings is an enlarged front view illustrated in FIGS. 2 and 3B for the connection of a two-piece separable and foldable walking beam, which is axially (longitudinally or vertically) foldable when the system requires servicing.
Figure 10C:
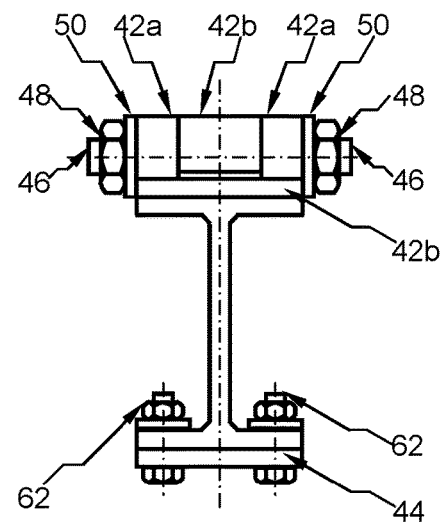
FIG. 10C of the drawings is an enlarged side view illustrated in FIGS. 2 and 3B for the connection of a two-piece separable and foldable walking beam, which is axially (longitudinally or vertically) foldable when the system requires servicing.

In FIGS. 8-10, the arrangements are very similar to that of FIG. 7 as discussed above. The major difference is the structure of the fastening plate, which has one complete plate instead of having two parts. The two pieces—left piece 40a and right piece 40b—of the foldable walking beam 40 are connected by a pin plate 42 with two parts 42a and 42b and a full piece of fastening plate 44 on the top and bottom of the beam 40 respectively. The two parts—left pin plate 42a and right pin plate 42b—of pin plate 42 are joined through a pin bolt 46 with pin bolt screws 48 and washers 50. On the top of beam 40 the left part 42a of pin plate 42 is fastened using bolts 60 as illustrated in FIG. 8 or permanently welded or joined using adhesive as illustrated in FIGS. 9-10 to the left piece 40a of beam 40. The right part 42b of pin plate 42 is fastened using bolts 58 as illustrated in FIGS. 8-9 or permanently welded or joined using adhesive as illustrated in FIG. 10 to the right piece 40b of beam 40. Under the bottom of beam 40 the left section of fastening plate 44 is connected using bolts 64 as illustrated in FIG. 8 or permanently welded or joined using adhesive as illustrated in FIGS. 9 and 10 to the left piece 40b of beam 40 while the right section of fastening plate 44 is connected using bolts 62 to the right piece 40b of beam 40. When the sucker rod pumping system requires servicing (such as plunger pump repair or plunger body cleaning or component replacement), the horsehead 10 which is vertically above the well head 20 as illustrated in FIG. 1 needs to be moved away from its operating position. This occurs by rotating the right piece 40b of the walking beam 40 fitted with a horsehead 10 and locking it to the left piece 40a of the walking beam 40 around a pin bolt 46 axially (longitudinally or vertically) as illustrated in FIG. 3B by unfastening bolts 62 as illustrated in FIGS. 8-10 or unfastening bolts 64 as illustrated in FIG. 8 instead of dismantling the horsehead 10 from the walking beam 40.

The description and parameters previously outlined in this document concerning the invention of interest should be accessible and discernable to those versed in the field. This includes but is not limited to the optimal design parameters/dimensions, spatial relationships, dimensional relationships, size variations, materials, form, and function. Proper appreciation of which would result in sufficient understanding of what this invention encompasses. The description found in this document provides an accurate and ideal form of the invention but should not limit or constrain further necessary equivalent modifications (operation, construction, and everything that entails) dependent on context.

The invention claimed is:

1. A two-piece coupling separable and foldable walking beam for sucker rod pumping systems including two pieces which are connected by plates, comprising:
   (A) a pin plate having two parts which are jointed through a pin bolt, washers, and screws, wherein one part of the pin plate is connected to the left piece without a horsehead of the two-piece walking beam and the opposing part of the pin plate is connected to the right piece with a horsehead of the two-piece walking beam,
   (B) a fastening plate having two variants which are:
      a structure of one full piece fastening plate in which half of the fastening plate is connected to the left piece without a horsehead of the two-piece walking beam and the opposing half of the fastening plate is connected to the right piece with a horsehead of the two-piece walking beam; and
      a structure of two parts which are connected using fasteners to form the fastening plate in which one part of the fastening plate is connected to the left piece without a horsehead of the two-piece walking beam and the opposing part of the fastening plate is connected to the right piece with a horsehead of the two-piece walking beam,
   (C) a strengthening plate added to the beam connection of the two-piece walking beam, wherein the strength of the connection is enhanced by the strengthening plate in which one part of the strengthening plate is connected to the left piece without a horsehead of the two-piece walking beam and the opposing part of the strengthening plate is connected to the right piece with a horsehead of the two-piece walking beam.

2. The two-piece coupling separable and foldable walking beam of claim 1, wherein the two-piece walking beam is separable at the connection.

3. The two-piece coupling separable and foldable walking beam of claim 1, wherein the two-piece walking beam is foldable around the pin bolt of the pin plate.

* * * * *